United States Patent [19]

Lee

[11] Patent Number: 6,091,397
[45] Date of Patent: Jul. 18, 2000

[54] AUTOMATIC SCREEN BRIGHTNESS COMPENSATING DEVICE AND METHOD THEREOF

[75] Inventor: Jae-Uck Lee, Kyungki-do, Rep. of Korea

[73] Assignee: SamSung Electronics Co., Ltd., Suwon, Rep. of Korea

[21] Appl. No.: 08/948,039

[22] Filed: Oct. 9, 1997

[30] Foreign Application Priority Data

Oct. 9, 1996 [KR] Rep. of Korea ............... 96-44874

[51] Int. Cl.$^7$ ............................................. G09G 5/10

[52] U.S. Cl. ............................ 345/147; 345/20; 345/22

[58] Field of Search ........................... 345/147, 148, 345/149, 20, 10, 11, 22, 27, 211, 212, 213, 150; 348/645, 655, 671, 673, 687, 206, 256; 315/383, 381

[56] References Cited

U.S. PATENT DOCUMENTS

| | | | |
|---|---|---|---|
| 3,930,120 | 12/1975 | Keller et al. | 345/206 |
| 5,077,502 | 12/1991 | Shaklee et al. | 348/256 |
| 5,400,086 | 3/1995 | Sano et al. | 348/655 |

*Primary Examiner*—Xiao Wu
*Attorney, Agent, or Firm*—Robert E. Bushnell, Esq.

[57] ABSTRACT

Provided is a cathode ray tube video display device, including: a micro computer for receiving data of factors affecting the brightness of a screen with time, computing a decreased amount of the brightness of the screen to compensate for the decreased amount and outputting a screen brightness compensation signal; and cathode ray tube controlling means for receiving the screen brightness compensation signal output from the micro computer, controlling a brightness level of a chrominance signal applied externally according to a level of the screen brightness compensation signal, and compensating the brightness of the screen which is decreased with time.

10 Claims, 11 Drawing Sheets

AUTOMATIC SCREEN BRIGHTNESS COMPENSATING DEVICE AND METHOD THEREOF

CLAIM OF PRIORITY

This application makes reference to, incorporates the same herein, and claims all benefits accruing under 35 U.S.C. §119 from an application for AUTOMATIC SCREEN BRIGHTNESS COMPENSATING DEVICE AND METHOD earlier filed in the Korean Industrial Property Office on Oct. 9, 1996 and there duly assigned Serial No. 44874/1996.

BACKGROUND OF THE INVENTION

1. Field of the Invention

The present invention relates to a device of automatically compensating for the brightness of a screen of a cathode ray tube (CRT) and a method thereof. More particularly, the method is used for automatically compensating for the brightness of a screen by computing an added value of a factor for decreasing the brightness of CRT and outputting a control signal for adjusting the brightness with the computed value.

2. Discussion of Related Art

In general, among peripheral devices for processing data generated in main system of a personal computer (PC), a display monitor is a device used for displaying the data as images on a screen. The display monitor is a device for displaying data generated in the main body of PC at the fastest speed and most conveniently. The monitor is connected generally with the main device as a peripheral device among those data processing systems.

The general display monitor will be described below with reference to the attached drawings.

FIG. 1 is a block diagram illustrating an inner circuit of a general monitor. As shown in the drawing, PC 100 includes CPU 110 for receiving a key board signal input by a user, processing and generating data according to the result of the process; and a video card 120 for receiving data output from CPU 110 to process into R. G. B. video signals, and outputting the processed R. G. B. signals and horizontal and vertical synchronization signals H-SYNC and V-SYNC for synchronizing the R. G. B. video signals.

A monitor which receives the R. G. B. video signals and the horizontal and vertical synchronization signals H-SYNC and V-SYNC output from the video card 120 in the PC 100, includes a micro computer 210 for receiving the horizontal and vertical synchronization signals H-SYNC and V-SYNC; a control button unit 220 for generating and outputting a screen control signal for controlling a monitor screen; a horizontal and vertical output circuit unit 230 for receiving a monitor screen control signal and a reference oscillation signal output from the micro computer 210 and synchronizing a raster; a video circuit 240 for receiving and displaying the R. G. B. video signals output from the video card 120; and a power circuit 250 for supplying power voltage to the micro computer 210, the horizontal and vertical output circuit 230, and the R. G. B. video signal processing unit 240.

Each block in the thus-structured monitor 200 will be described in detail.

The micro computer 210 receives the horizontal and vertical synchronization signals H-SYNC and V-SYNC from the video card 120. The micro computer 210 has the various monitor screen control data.

If the control button unit 220 applies a monitor screen control signal to the micro computer 210, the micro computer 210 outputs an image control signal for controlling image displayed on the screen according to the screen control signal. The control button unit 220 outputs the horizontal and vertical position control signals and the horizontal and vertical size control signals. The micro computer 210 receiving the monitor screen control signal outputs an image control signal and a reference oscillation signal.

A horizontal and vertical oscillation signal processor 230-1 receiving the image control signal and the reference oscillation signal from the micro computer 210 controls the switching speed of an on/off operation of a saw tooth wave generation circuit 230 according to the horizontal and vertical synchronization signal H-SYNC and V-SYNC applied from the video card 110. A vertical pulse drive circuit 230-2 receives a vertical pulse from the horizontal and vertical oscillation signal processor 230-1. In general, for the vertical pulse drive circuit 230-2, there are used a single stage vertical amplifying type and an emitter follower type for receiving input through a base and outputting output through an emitter. Therefore, the circuit improves its straightness rather than gains.

The vertical output circuit 230-3 receiving the current signal from the vertical drive circuit 230-2 generates the saw tooth wave current conformed with the vertical synchronization pulse flowing through V-DY 230-4, and thus determines a vertical scanning period. In addition, a horizontal drive circuit 230-5 receives a horizontal oscillation signal output from the horizontal and vertical oscillation signal processor 230-1. The horizontal drive circuit 230-5 supplies current sufficient for turning on/off the horizontal output circuit 230-6. To be used for the horizontal drive circuit 230-6, there are two methods: an in-phase type in which when drive terminal is at ON state, its output terminal is at ON state; and an anti-phase type in which when the drive terminal is at ON state, its output terminal is at OFF state, the method being widely used currently.

The horizontal output circuit 230-6 which receives the current from the horizontal drive circuit 230-5 generates the saw tooth wave current to H-DY 230-7. The horizontal scanning period is determined by this saw tooth wave current.

A fly-back line collector is used for supplying the stable DC voltage to an anode terminal 2404-1 of CRT 240-4 through a flyback transformer (FBT) 230-9. With a small collector pulse, a high voltage is generated and applied to the anode terminal 240-2-1 of CRT 240-3 by using higher harmonics according to a leakage inductance and a distributed capacity.

There follows a procedure of displaying the R. G. B. video signals to CRT 240-3 in the video signal processor 240 receiving high voltage through the anode terminal 240-4-1.

An OSD unit 240-1 receiving OSD gain signal generated according to the screen control of the micro computer 210 generates and outputs OSD gain signal. A video pre-amplifier 240-2 receiving the OSD gain signal and the R. G. B. video signals from the video card 120 amplifies the low R. G. B. signals by a low-voltage amplifier to thereby maintain a predetermined level. For example, a signal below 1 $V_{pp}$ is amplified to a signal of 4 to 6 $V_{pp}$. The amplified signal is re-amplified to 40 to 60 $V_{pp}$ through a video main amplifier 240-3, and is used for supplying energy to each pixel. The video signals amplified in the video main amplifier 240-3 is applied to a cathode of CRT 240-3 to display the R. G. B. video signals on the monitor screen.

A power circuit 250 for supplying a driving voltage required for displaying the video signals receives alternating current (AC) through an input port 250-1. A degaussing coil 250-2 receiving AC recovers a chromaticity on the screen whose saturation is decreased because of a spread caused from an earth magnetic field or external condition, into an original state. For this operation, if AC is applied for two to eight seconds to the degaussing coil 250-2, the magnetic field formed on the shadow mask in the monitor gets diffused, and thus the spread of a color is retrieved into the original state. The AC is rectified through the AC rectifier 250-3 and output to a switching transformer 250-4. The switching transformer 250-4 performs a switching operation, and supplies various operating voltages required for the monitor 200 through a voltage output terminal 250-5.

Here, if the vertical synchronization signal V-SYNC is not applied from the video card 120, the micro computer 210 cuts off the deflection voltage by applying a suspend-mode signal to the voltage regulator 250-6. A pulse-width modulation unit (PWM) 250-7 performs an on/off operation of the switching device with a curved-wave pulse, and the variation of the pulse width increases/decreases the conduction time, stabalizing the output voltage. If the micro computer 210 cannot detect the horizontal and vertical synchronization signals H-SYNC and V-SYNC, the micro computer 21 applies a power off mode signal to PWM unit 250-7. The PWM unit 250-7 becomes low level, and therefore cuts off the voltage applied to the monitor 200. Accordingly, it saves power consumption in the monitor.

With reference to the attached drawings, there will be described below the structure of CRT 240-4 which displays the R. G. B. video signals used in the conventional display monitor or television.

In FIG. 2, there are illustrated a base 240-4a and an outer lead 240-4b each for receiving the R. G. B. video signals and heating current; a magnet assembly 240-4c and an electronic gun 240-4d for generating electronic beam 8 according to the video signals, controlling an amount and speed of the electronic beam 8 and serving as a lens; horizontal and vertical deflection coils 240-4e and 240-4f for deflecting the electronic beam 8 in every direction; a shadow mask 240-4g dot or stripe-structured on a thin steel plate to make contact with the fluorescent chromatic material in correspondence with the electronic beam 8; a screen 240-4h on which the fluorescent material is coated to emit light when the electronic beam 8 passing through the shadow mask 240-4g makes contact with it; a getter 240-4j for gathering contaminants and sticking them onto a wall of a funnel 240-4i, namely, a glass tube in order to increase vacuum degree in CRT 240-4; an anode junction point 240-4-1 for receiving high voltage from FBT 230-9 (refer to FIG. 1); a glass panel 240-4k; a magnetic shield 240-4l; and a tension band 240-4m.

The thus-structured general CRT operates as follows.

The electronic gun 240-4d generates great or small beam 8 according to the intensity of the R. G. B. video signals from PC 100 (see FIG. 1). This cathode electronic beam 8 proceeds toward the plate by being led by the high anode voltage applied to an anode grid (or plate, not shown). When, the accelerated electronic beam 8 passes through the plate and hit the screen 240-4h coated with fluorescent material on the surface flourescent material on the surface of CRT 230-4, the energy of the electronic beam 8 is emitted in the form of light. The light signal is scanned in every direction of CRT 240-4 by the horizontal and vertical deflection coils 240-4e and 240-4f, thus displaying the R. G. B. video signals.

There will be described the variation of brightness of the thus-structured conventional CRT 240-4 with time with reference to the attached drawings.

As illustrated in FIG. 3, Y axis of a graph represents the brightness of the screen, and X axis represents the used time of the monitor in the unit of 1000 hours, namely, 1K hour. When using the monitor firstly in this graph, the brightness of the screen is lowered from 100% to 80% via 8K hours, namely, 8000 hours (The test should be performed in the same condition). With a lapse of the used time of the monitor, a gradual decrease of the brightness is because the amount of the electronic beam generated in the electronic gun 240-4e is decreased, and also because when the fluorescent material coated on the screen 240-4h emits light, it is ignited and thus its light emitting efficiency is decreased.

Though the characteristics of the components used for the display monitor and television are improved to thereby extend the life time, its light emitting efficiency of the fluorescent material in CRT is however decreased, accordingly decreasing the brightness of the screen below the regulated value only in one or two hours.

SUMMARY OF THE INVENTION

Accordingly, the present invention is directed to an automatic screen brightness compensating device and a method thereof that substantially obviates one or more of the problems due to limitations and disadvantages of the related art.

An object of the present invention is to provide a device and a method of automatically compensating the brightness of a screen of a dark CRT by composing factors decreasing the brightness in a circuit, controlling it to thereby automatically compensate for the brightness of the screen inside the display monitor or an inner circuit of television.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an automatic screen brightness compensating device of CRT of the invention includes: an integrator for integrating factors which decrease the brightness of screen with time; a storage means for storing the brightness compensating data according to a sum of each factor calculated in the integrator; and a brightness compensating unit for receiving the brightness compensating data output from the storage means, generating the brightness compensation signal and outputting it.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF PREFERRED EMBODIMENT

Reference will now be made in detail to the preferred embodiments of the present invention, examples of which are illustrated in the accompanying drawings.

Figure 4:
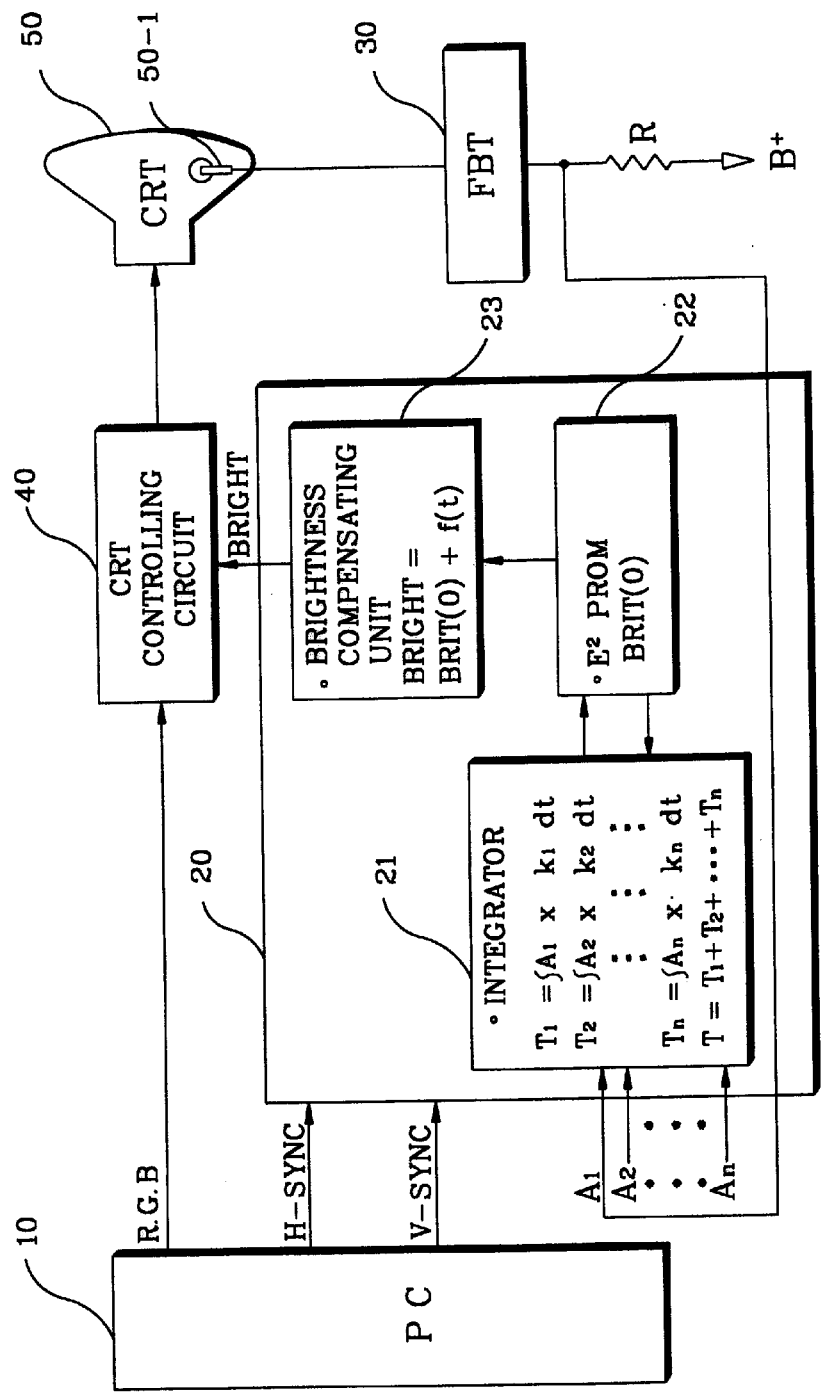
FIG. 4 is a block diagram illustrating an automatic screen brightness compensating device of CRT according to the invention.

As illustrated in FIG. 4, a device of automatically compensating the brightness of the screen of CRT includes: PC 10 for operating PC program, outputting the R. G. B. video signals and horizontal and vertical synchronization signals H-SYNC and V-SYNC for synchronizing the video signals according to the result of the operation; a micro computer 20 for receiving the horizontal and vertical synchronization signals H-SYNC and V-SYNC from PC 10 to determine the resolution and polarity, receiving a display monitor controlling switch signal from a display monitor screen controlling switch (not shown) attached to an external case of the display monitor to output various control signals of the display monitor screen, seeking the integration values by integrating and summing the decreasing factors $A_1, A_2, \ldots A_n$ and the added values $K_1, K_2 \ldots K_n$ according to each decreasing factor $A_1, A_2 \ldots A_n$, summing the accumulated integrating value and the compensation function, and outputting the brightness compensation signal BRIGHT; FBT 30 for receiving high voltage $B^+$ from a high voltage outputting circuit (not shown), raising its voltage and outputting a high voltage; a CRT controlling circuit 40 for amplifying the R. G. B. video signals, controlling and outputting the brightness level of the video signals according to the level of the brightness compensation signal BRIGHT output from the micro computer 20; and CRT 50 for receiving the R. G. B. video signals output from the CRT controlling circuit 40 and displaying them.

The micro computer 20 includes an integrator 211 which receives the screen brightness decreasing factors $A_1, A_2 \ldots An$, and integrates the values $A_1 \times K_1, A_2 \times K_2 \ldots A_n \times K_n$ gained by multiplying the $K_1, K_2 \ldots K_n$ according to each screen brightness factors $A_1, A_2 \ldots An$ by the used time period to thereby seeking the integration values $T_1, T_2 \ldots T_n$; an $E^2$PROM 22 for receiving the integration values $T_1, T_2 \ldots T_n$ and storing them; and a brightness compensating unit 23 for receiving the sum T of the integration values by factors stored in the $E^2$PROM 22 to generate a compensation function f(T), summing the compensating function f(T) and the initial value BRIT(0) of the brightness compensation signal and outputting the screen brightness compensation signal BRIGHT.

An operation of the thus-structured device will be described below.

The PC 10 converts the data resulted from operating the PC program into the R. G. B. video signals, and outputs the horizontal and vertical synchronization signals H-SYNC and V-SYNC for synchronizing the R. G. B. video signals. The synchronization signals H-SYNC and V-SYNC are applied to the micro computer 20 in the display monitor. The micro computer 20 analyses the horizontal and vertical synchronization signal inputs H-SYNC and V-SYNC and determines a video mode applied from the PC 10 and its polarity. After the determination, the micro computer 20 receives the screen controlling switch signal output from the screen control switch attached to the external case of the display monitor and outputs various screen controlling signals. The screen control signals are output according to the adjusting program automatically set in the micro computer 20.

Meanwhile, the FBT 30 receives a high voltage $B^+$ from a horizontal output circuit through a resistor R, raising its voltage and outputting the high voltage to an anode junction point 50-1 in CRT 50. By the high voltage output from FBT 30, the beam current scanned from the electronic gun excessively flows and generates overload, so that the screen brightness decreasing factor $A_1$ is generated in the display monitor screen, and applied to an integrating device 21 in the micro computer 20. The integrating device 21 additionally receives the screen brightness decreasing factors $A_2, A_3 \ldots A_n$ other than the factor A1 by FBT 30. The integrating device 21 receiving those screen brightness factors $A_1, A_2 \ldots A_n$ multiplies them by the added values $K_1, K_2 \ldots K_n$ according to each screen brightness decreasing factor $A_1, A_2 \ldots A_n$. By integrating the values $A_1 \times K_1, A_2 \times K_2 \ldots A_n \times K_n$ multiplied in the integrating device 21 according to the used time period, the integration values $T_1, T_2 \ldots T_n$ can be obtained.

The integration values are:

$$T_1 = \int A_1 \times K_1 dt, \quad (1)$$

$$T_2 = \int A_2 \times K_2 dt \quad (2)$$

$$T_n = \int A_n \times K_n dt \quad (n)$$

Here, each integral equation (1 . . . n) is computed by multiplying every screen brightness factor $A_1, A_2 \ldots A_n$ which decreases the brightness of the display monitor screen by each added value $K_1, K_2 \ldots K_n$ and integrating them according to the used time period. When summing each integration value $T_1, T_2 \ldots T_n$, the sum T of the integration value by factor can be output. The sum T output from the integrating device 21 is applied to the storage means $E^2$PROM 22. The sum T of the integration value by factor and the initial value BRIT(0) of the brightness compensating value are applied to the brightness compensating unit 23. The brightness compensating unit 23 generates a compensation function f(T) for converting the sum T of the integrated values by factor into the brightness compensation signal. The compensation function f(T) is added to the initial value BRIT(0) of the brightness compensation signal, and output as the brightness compensation signal BRIGHT. The brightness compensation signal BRIGHT is applied to the CRT controlling circuit 40. The CRT controlling circuit 40 receives the R. G. B. video signals from PC 10, amplifies them according to the screen brightness compensation signal BRIGHT and output them to CRT 50. The CRT 50 compensates the brightness of image displayed on the monitor screen according to the brightness compensation signal BRIGHT and displays the image on the screen. Therefore, the screen brightness decreasing factor generated in the display monitor is compensated. With the brightness compensation signal selecting switch, we can select the enable or disable of the automatic brightness compensation signal.

The brightness compensation signal selecting switch will be described with reference to the attached drawing.

Figure 1:
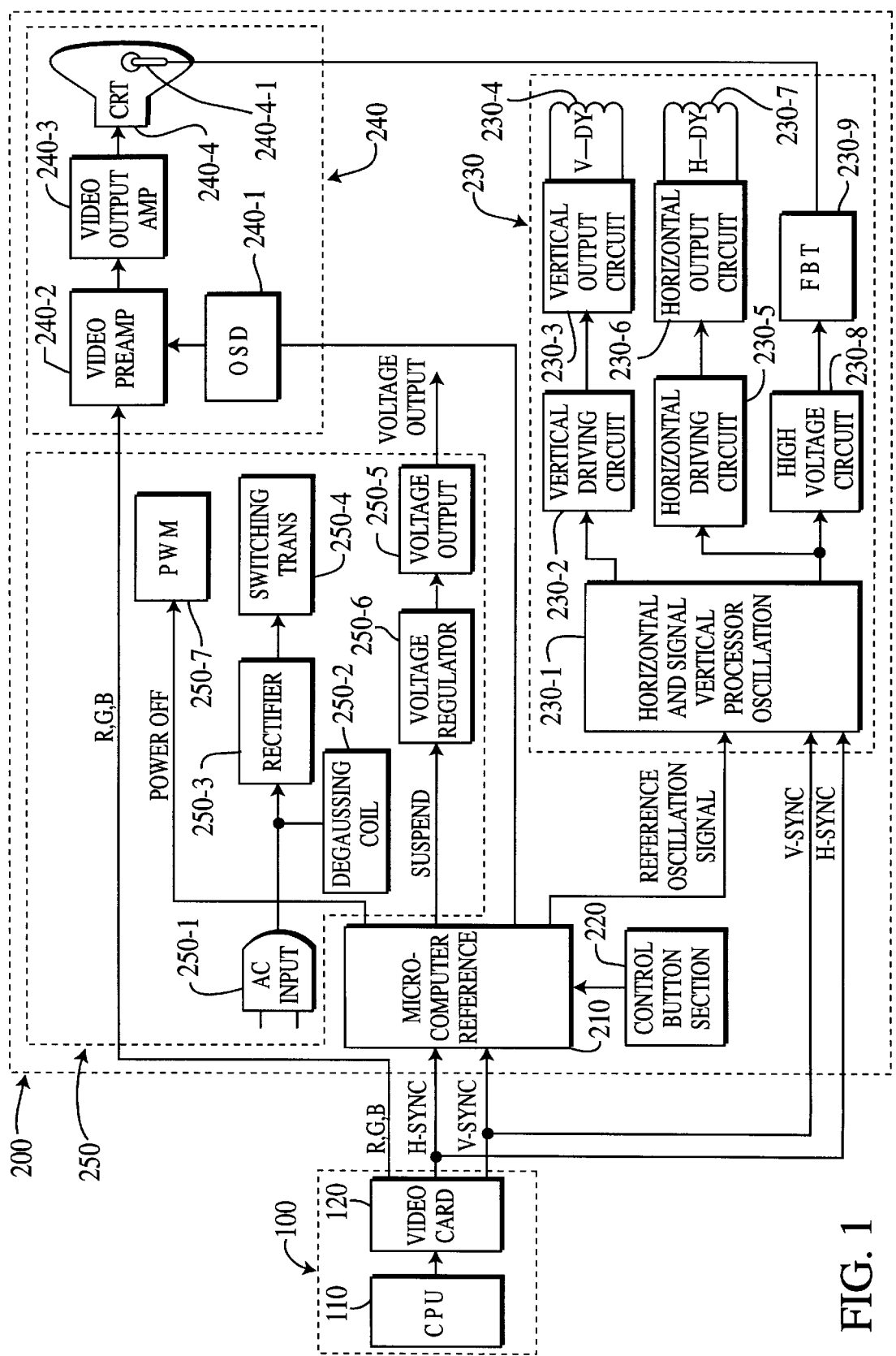
FIG. 1 is a block diagram of a general inner circuit of a conventional display monitor.
Figure 2:
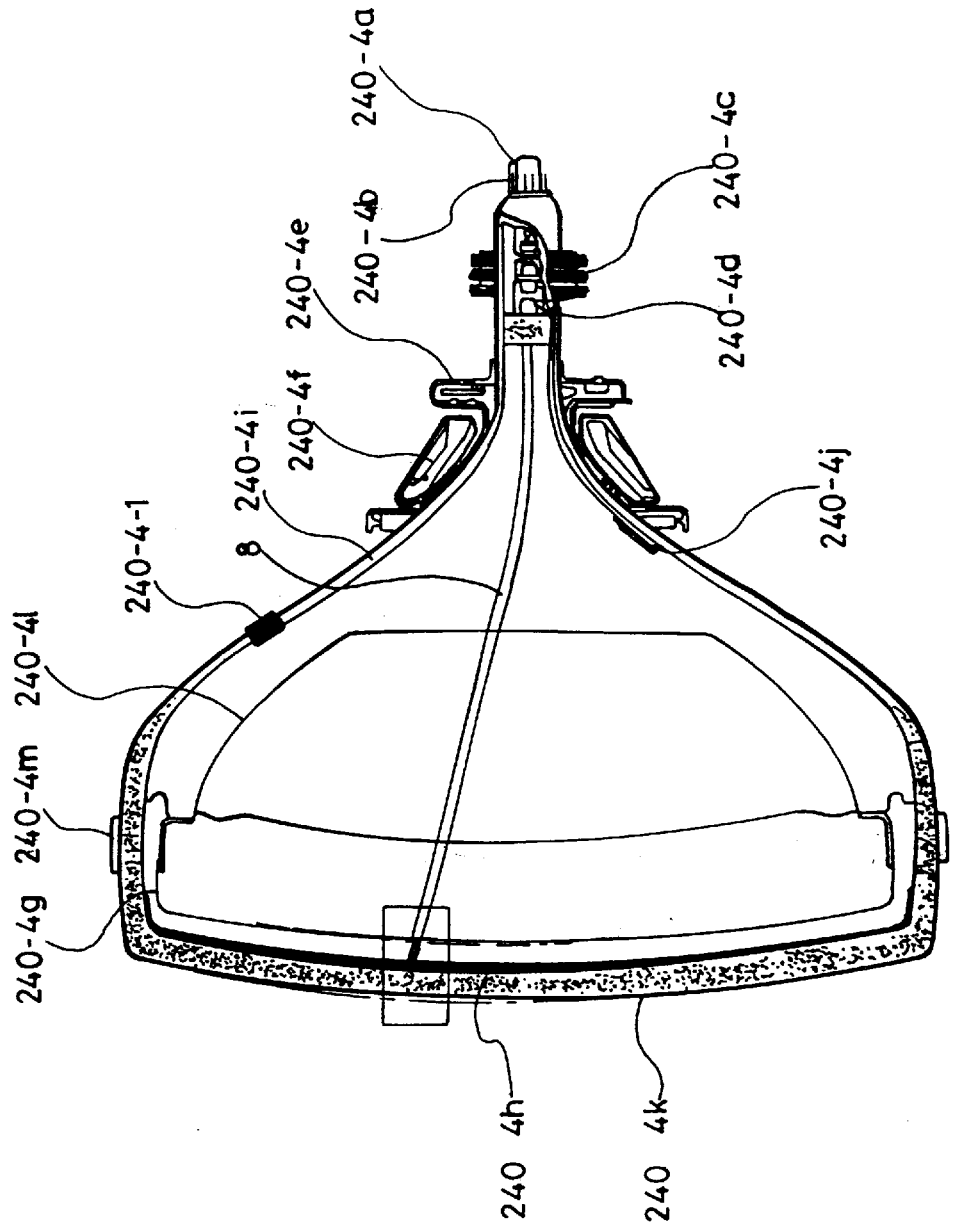
FIG. 2 illustrates the structure of a cathode ray tube of FIG. 1 in detail.
Figure 3:
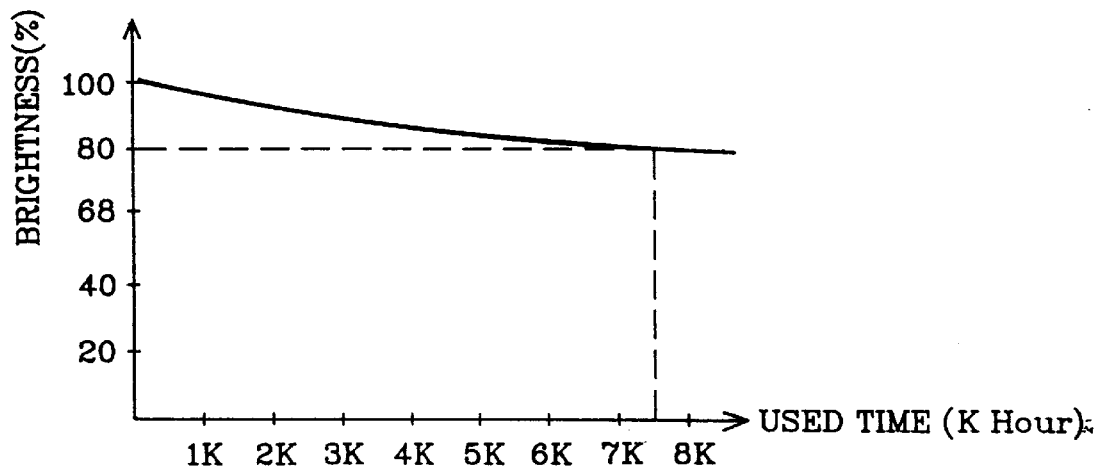
FIG. 3 is a graph illustrating a curved screen brightness line of CRT of FIG. 2.
Figure 5:
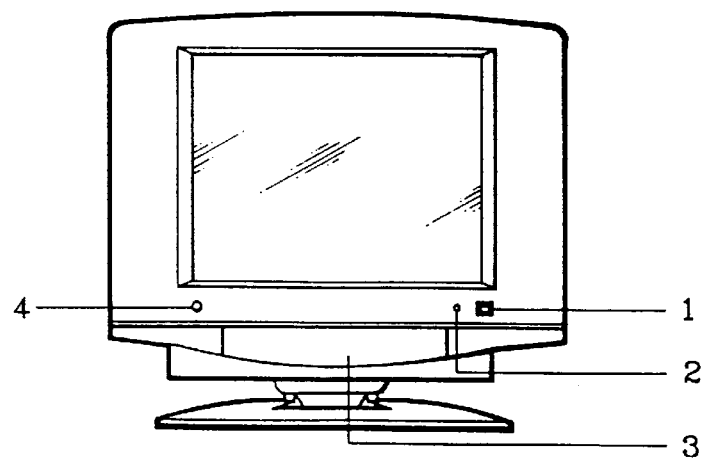
FIG. 5 is a front view illustrating the external appearance of the display monitor according to the invention.

In FIG. 5, there are illustrated a power switch 1 for turning on power of the display monitor; a light emitting diode LED lamp 2 for displaying POWER-ON according to the turn-on of the power switch; a control box 3 for controlling the display monitor screen; and an automatic brightness controlling selection switch 4.

An embodiment of the automatic screen brightness compensating device is described below with reference to the attached drawing.

Figure 6:
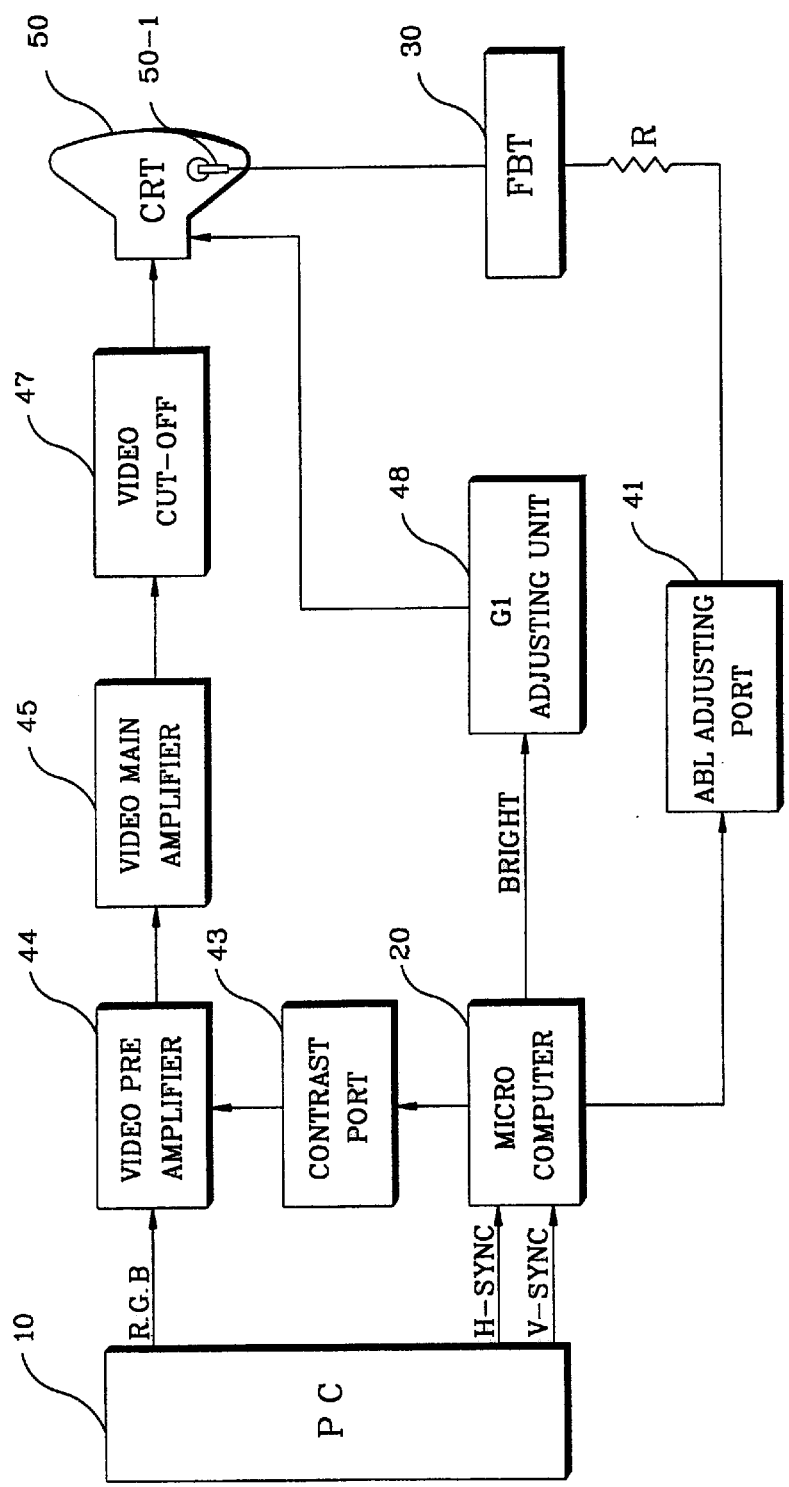
FIG. 6 is a block diagram of the automatic screen brightness compensating device of CRT according to a first embodiment of the invention.

As illustrated in FIG. 6, the automatic screen brightness compensating device includes: PC 10 for generating R. G. B. video signals and outputting horizontal and vertical synchronization signals H-SYNC and V-SYNC for synchronizing the video signals; a micro computer 20 for receiving the horizontal and vertical synchronization signals H-SYNC and V-SYNC, analyzing them to determine their resolutions, receiving the screen control signal from a control switch mounted on the external case of the monitor to output the screen control signal, and receiving the screen brightness decreasing factors to output the brightness compensation signal according to decreasing the screen brightness; an ABL adjusting port 41 for receiving an automatic brightness limiter control signal among the screen brightness signal inputs from the micro computer 20; FBT 30 for receiving high voltage according to the ABL controlling signal applied from the ABL adjusting port 41, raising the voltage level, and controlling the output level of the high voltage; a contrast port 43 for receiving the contrast control signal among the monitor screen control signals applied from the micro computer 20 and outputting it; a video pre-amplifier 44 for receiving the contrast control signal from the contrast port 43 and amplifying the brightness level of the R. G. B. video signals into a predetermined level; a video main amplifier 45 for receiving the R I G. B. video signals from the video pre-amplifier and finally amplifying them; a video cut-off 47 for receiving the R. G. B. video signals from the video main amplifier 45 and controlling the difference among the video signals; a first grid G1 adjusting unit 48 for receiving the brightness compensation signal output from the micro computer 20 and controlling the amount of the beam scanned from the electronic gun (not shown); and CRT 50 for receiving a high voltage from FBT 30, controlling the brightness of the R. G. B. video signals output from the video cut-off 47 and displaying images.

An operation of the thus-structured device is as follows.

The micro computer 20 receiving the horizontal and vertical synchronization signals H-SYNC and V-SYNC from PC 10 outputs various control signals of the display monitor screen according to the switching signal applied from the screen control switch, and the brightness compensation signal BRIGHT according to the screen brightness decreasing factor. Among the display monitor screen control signals output from the micro computer 20, ABL control signal is applied to FBT 30 through the ABL adjusting port 41. The FBT 30 receiving the ABL control signal receives a high voltage from the high voltage output circuit (not shown), raises its voltage level and outputs the high voltage. Here, the ABL control signal serves for controlling overload of the beam current generated in CRT because of the high voltage output through FBT 30. The high voltage output from FBT 30 and controlled by the ABL control signal is applied to an anode junction point 50-1 and used for controlling the beam current.

Among the display monitor screen control signals output from the micro computer 20, the contrast control signal is applied to the video pre-amplifier 44 through the contrast port 43. The pre-amplifier 44 receiving the contrast control signal amplifies the R. G. B. video signals applied from the PC 10 into a predetermined level according to the contrast control level. The R. G. B. video signals output from the video pre-amplifier 44 are finally amplified in the video main amplifier 45 and output. The R. G. B. video signal outputs have difference among their levels, so that the video cut-off 47 controls the difference among R. G. B. video signal levels. The R. G. B. video signals whose levels are controlled by the video cut-off 47 are applied to CRT 50. Here, the first grid G1 adjusting unit 48 receiving the brightness compensation signal BRIGHT from the micro computer 20 compensates for the beam current scanned according to the brightness compensation signal BRIGHT. CRT 50 which controls the beam current according to the brightness compensation signal BRIGHT adjusts the R. G. B. video signals according to the beam current controlled and displays them. If CRT 50 adjusts the beam current scanned according to the brightness compensation signal BRIGHT, the brightness of image of R. G. B. video signals displayed in CRT 50 is compensated by the brightness compensation signal BRIGHT. Therefore, the screen brightness decreasing factor generated in the display monitor is compensated by using the first grid G1.

Another embodiment excluding the brightness compensating circuit using the first grid G1 adjusting unit 48 is described below with reference to the attached drawing.

Figure 7:
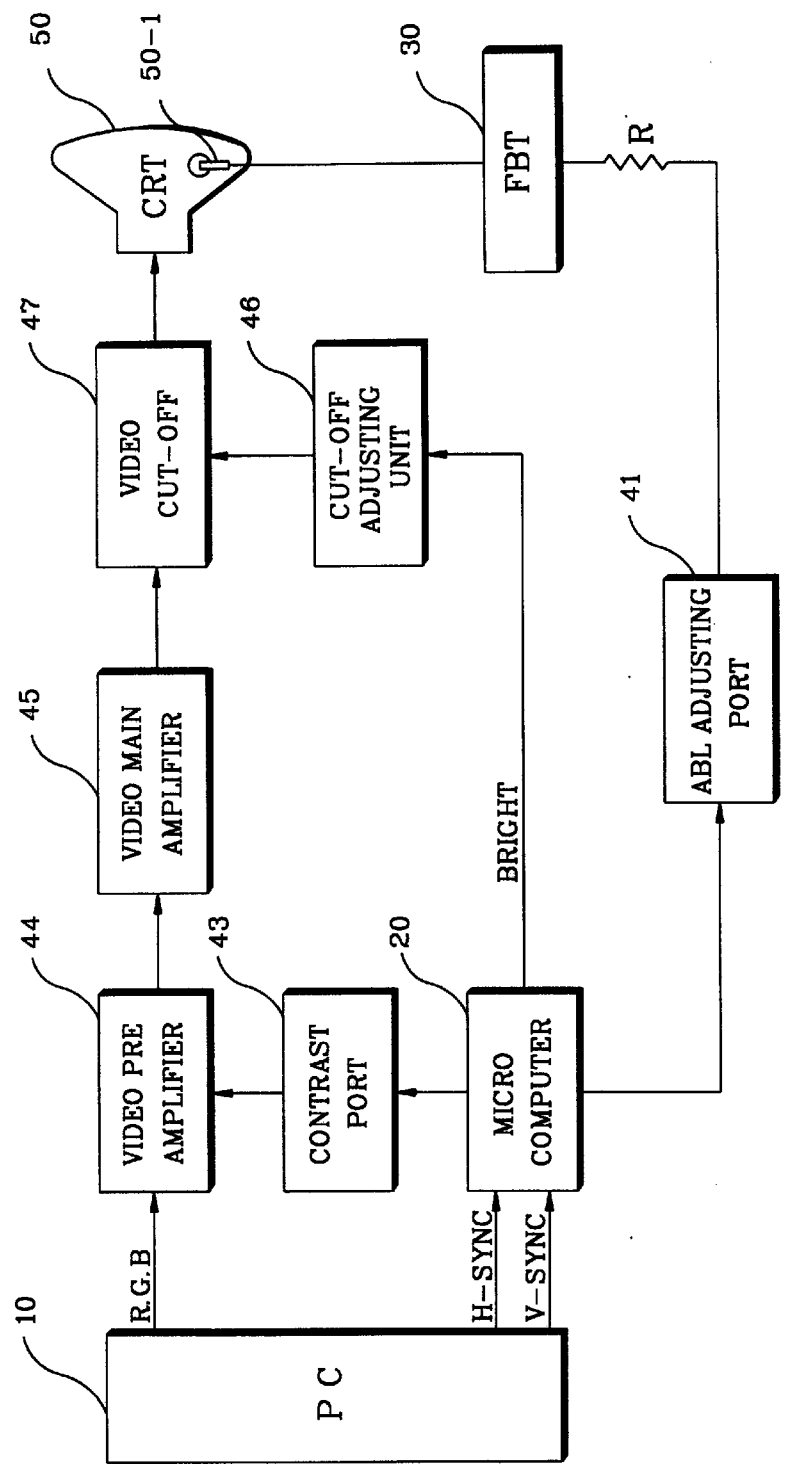
FIG. 7 is a block diagram of the automatic screen brightness compensating device of CRT according to a second embodiment of the invention.

As illustrated in FIG. 7, a second embodiment of the automatic brightness compensating device of the invention includes: PC 10 for generating R. G. B. video signals and outputting horizontal and vertical synchronization signals H-SYNC and V-SYNC for synchronizing the video signals; a micro computer 20 for receiving the horizontal and vertical synchronization signals H-SYNC and V-SYNC, analyzing them to determine their resolutions, receiving the screen control signal from a control switch mounted on the external case of the monitor to output the screen control signal, and receiving the screen brightness decreasing factors to output the brightness compensation signal according to decreasing the screen brightness; an ABL adjusting port 41 for receiving an automatic brightness limiter control signal among the screen brightness signal inputs from the micro computer 20; FBT 30 for receiving high voltage according to the ABL control signal applied from the ABL adjusting port 41, raising the voltage level, and controlling the output level of the high voltage; a contrast port 43 for receiving the contrast control signal among the monitor screen control signals applied from the micro computer 20 and outputting it; a video pre-amplifier 44 for receiving the contrast control signal from the contrast port 43, amplifying the brightness level of the R. G. B. video signals into a predetermined level and controlling their brightness according to the contrast control signal; a video main amplifier 45 for receiving the R. G. B. video signals from the video pre-amplifier and finally amplifying them; a video cut-off adjusting unit 47 for receiving the brightness compensation signal BRIGHT output from the micro computer 20, controlling the video cut-off level and compensating for the screen brightness; a video cut-off 47 controlled by the video cut-off adjusting unit 46 and controlling the difference among the R. G. B. video signals applied from the video main amplifier 45; and CRT 50 for receiving a high voltage from FBT 30, controlling the brightness of the R. G. B. video signals output from the video cut-off 47 and displaying images.

An operation of the thus-structured embodiment is described below.

The micro computer 20 generating the screen brightness compensation signal BRIGHT outputs the brightness compensation signal BRIGHT according to the screen brightness decreasing factor. Among the display monitor screen control signals output from the micro computer 20, ABL control signal is applied to FBT 30 through the ABL adjusting port 41. The FBT 30 receiving the ABL control signal receives a high voltage from the high voltage output circuit (not shown), raises its voltage level and outputs the high voltage. Here, FBT 30 receives the ABL adjusting signal, controlling the amount of current applied to the anode junction point 50-1 and restricting the generation of a factor which decreases the resolution of the screen due to the overload of the beam current. Among the display monitor screen control signals output from the micro computer 20, the contrast control signal is applied to the video pre-amplifier 44 through the contrast port 43. The pre-amplifier 44 receiving the contrast control signal amplifies the R. G. B. video signals applied from the PC 10 into a predetermined level according to the contrast control signal. The R. G. B. video signals output from the video pre-amplifier 44 are finally amplified in the video main amplifier 45 and output. The R. G. B. video signal outputs have difference among their levels, so that the video cut-off 47 controls the difference among R. G. B. video signal levels. The cut-off adjusting unit 46 controls the cut-off adjusting levels controlled in the video cut-off 47 according to the brightness compensation signal BRIGHT. The R. G. B. video signals whose levels are controlled by the video cut-off 47 are applied to CRT 50. CRT 50 displays images according to the R. G. B. video signal inputs. Therefore, the screen brightness decreasing factor generated in the display monitor is compensated by using the cut-off adjusting unit 46.

Another embodiment of the invention excluding the brightness compensating circuit using the cut-off adjusting unit 46 will be described below with the attached drawing.

Figure 8:
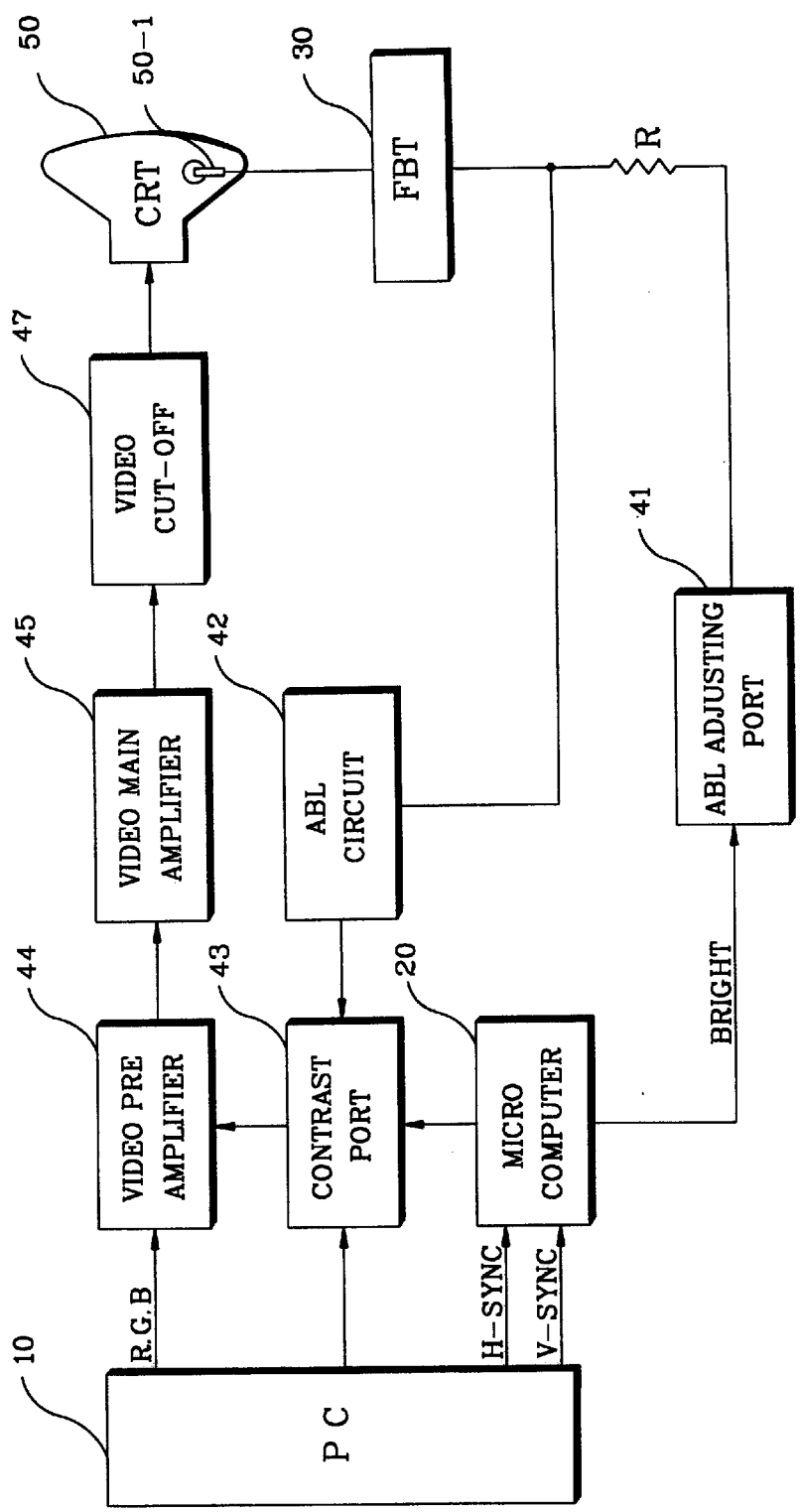
FIG. 8 is a block diagram of the automatic screen brightness compensating device of CRT according to a third embodiment of the invention.

As illustrated in FIG. 8, a third embodiment of the invention includes: PC 10 for generating R. G. B. video signals and outputting horizontal and vertical synchronization signals H-SYNC and V-SYNC for synchronizing the video signals; a micro computer 20 for receiving the horizontal and vertical synchronization signals H-SYNC and V-SYNC, analyzing them to determine their resolutions, receiving the screen control signal from a control switch mounted on the external case of the monitor to output the screen control signal, and receiving the screen brightness decreasing factors to output the brightness compensation signal according to decreasing the screen brightness; an ABL adjusting port 41 for receiving an automatic brightness limiter control signal according to the brightness compensation signal applied from the micro computer 20; FBT 30 for receiving high voltage according to the ABL controlling signal applied from the ABL adjusting port 41, raising the voltage level, and controlling the output level of the high voltage; an ABL circuit 42 for receiving the high voltage from FBT 30, detecting the amount of the high voltage current, and outputting ABL adjusting signal according to the brightness compensation signal BRIGHT; a contrast port 43 for receiving the contrast control signal among the monitor screen control signals applied from the micro computer 20 and the ABL adjusting signal applied from the ABL circuit 42, and outputting them; a video pre-amplifier 44 for receiving the contrast control signal from the contrast port 43 and the ABL adjusting signal, amplifying the R. G. B. video signals applied from PC 10 into a predetermined level and compensating for their brightness; a video main amplifier 45 for receiving the R. G. B. video signals from the video pre-amplifier 44 and finally amplifying them; a video cut-off 47 for receiving the R. G. B. video signals from the video main amplifier 45 and controlling the difference of the level among the video signals; and CRT 50 for receiving the R. G. B. video signals from the video cut-off 47 and displaying them.

The brightness compensating circuit according to the third embodiment of the invention operates as follows.

The micro computer 20 generating the screen brightness compensation signal BRIGHT outputs the brightness compensation signal BRIGHT according to the screen brightness decreasing factor. Among the display monitor screen control signals output from the micro computer 20, ABL control signal is applied to FBT 30 through the ABL adjusting port 41. The FBT 30 receiving the ABL control signal receives a high voltage from the high voltage output circuit (not shown), raises its voltage level and outputs the high voltage. The high voltage is applied to the anode junction point 50-1. Here, the screen brightness compensation signal with respect to the screen brightness decreasing factor applied from the micro computer 20 is applied to the ABL adjusting port 41 and to the ABL circuit 42 through the resistor R. The ABL circuit 42 receiving the screen brightness compensation signal applied for the micro computer 20 controls the level of the ABL adjusting signal and applies it to the contrast port 43. Additionally, the contrast port 43 receiving the contrast control signal among the display monitor screen control signals output from the micro computer applies the ABL adjusting signal with the contrast control signal to the video pre-amplifier 44. The video pre-amplifier 44 compensates for the levels of the ABL adjusting signal and the contrast control signal and thus compensates for the brightness of the R. G. B. video signals applied from PC 10. The R. G. B. video signals output from the video pre-amplifier 44 are finally amplified in the video main amplifier 45 to thereby control the difference in their levels. CRT 50 receiving the R. G. B. video signals output from the video cut-off 47 compensated according to the brightness compensation signal BRIGHT through the cut-off adjusting unit 46 displays images with the R. G. B. video signal inputs. Therefore, the screen brightness decreasing factor generated in the displaying monitor is compensated by using the ABL circuit 42.

Another embodiment using the ABL circuit 42 and the cut-off adjusting unit 46 is described below with the attached drawing.

Figure 9:
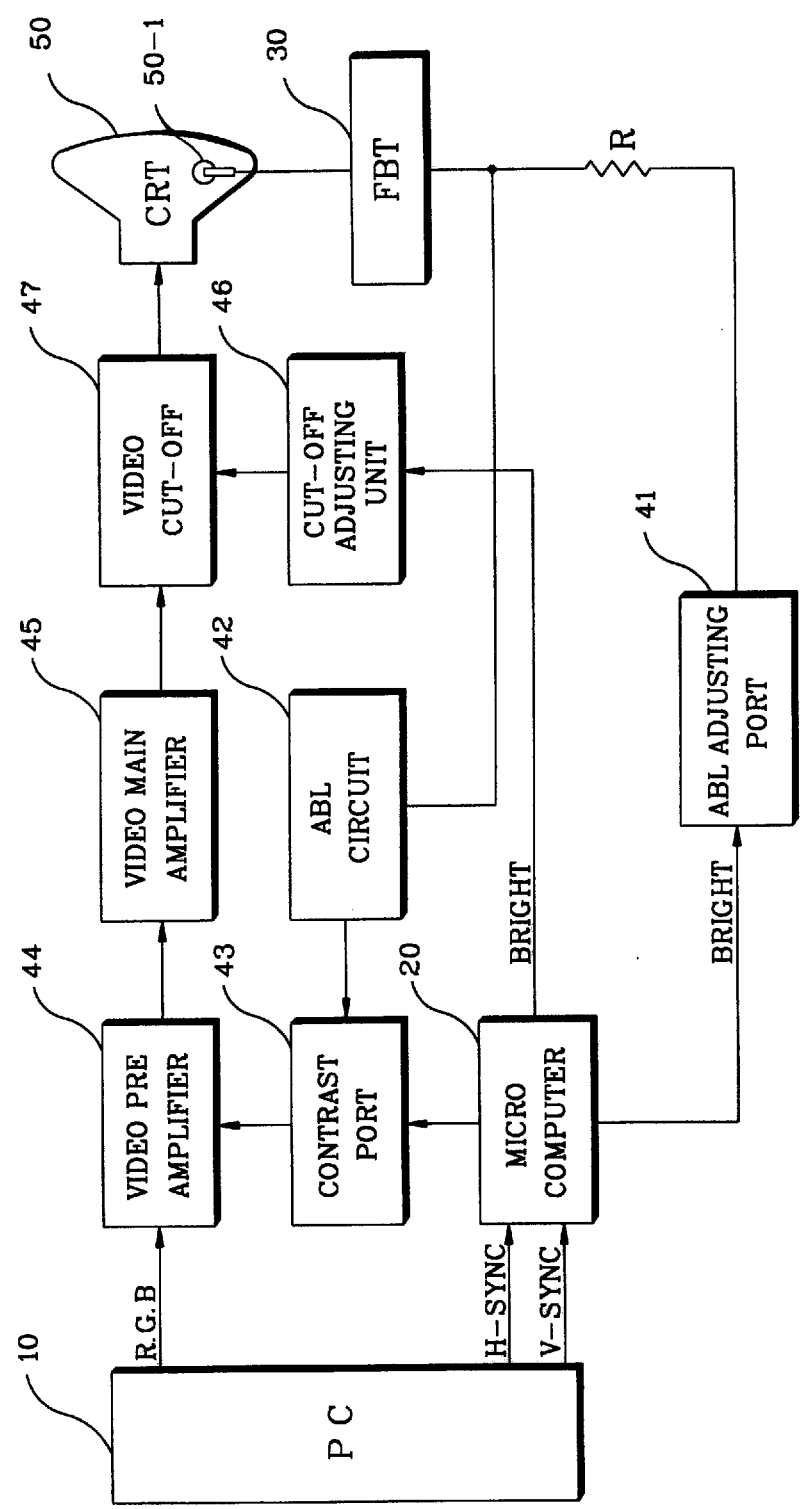
FIG. 9 is a block diagram of the automatic screen brightness compensating device of CRT according to a fourth embodiment of the invention.

As illustrated in FIG. 9, a fourth embodiment of the automatic screen brightness compensating device includes:

PC 10 for generating R. G. B. video signals and outputting horizontal and vertical synchronization signals H-SYNC and V-SYNC for synchronizing the video signals; a micro computer 20 for receiving the horizontal and vertical synchronization signals H-SYNC and V-SYNC, analyzing them to determine their resolutions, receiving the screen control signal from a control switch mounted on the external case of the monitor to output the screen control signal, and receiving the screen brightness decreasing factors to output the brightness compensation signal according to decreasing the screen brightness; an ABL adjusting port 41 for receiving an automatic brightness limiter control signal according to the brightness compensation signal applied from the micro computer 20; FBT 30 for receiving high voltage according to the ABL controlling signal applied from the ABL adjusting port 41, raising the voltage level, and controlling the output level of the high voltage; an ABL circuit 42 for receiving the high voltage from FBT 30, detecting the amount of the high voltage current, and outputting ABL adjusting signal according to the brightness compensation signal BRIGHT; a contrast port 43 for receiving the contrast control signal among the monitor screen control signals applied from the micro computer 20 and the ABL adjusting signal applied from the ABL circuit 42, and outputting them; a video pre-amplifier 44 for receiving the contrast control signal from the contrast port 43 and the ABL adjusting signal, amplifying the R. G. B. video signals applied from PC 10 into a predetermined level and compensating for their brightness; a video main amplifier 45 for receiving the R. G. B. video signals from the video pre-amplifier 44 and finally amplifying them; a cut-off adjusting unit 46 for receiving the brightness compensation signal BRIGHT from the micro computer 20 and controlling the cut-off level; a video cut-off 47 controlled by the cut-off adjusting unit 46 and controlling the difference among the R. G. B. video signals applied from the video main amplifier 45; and CRT 50 for receiving the R. G. B. video signals from the video cut-off 47 and displaying them.

The brightness compensating circuit according to the third embodiment of the invention operates as follows.

The micro computer 20 generating the screen brightness compensation signal BRIGHT outputs the brightness compensation signal BRIGHT according to the screen brightness decreasing factor. Among the display monitor screen control signals output from the micro computer 20, ABL control signal is applied to FBT 30 through the ABL adjusting port 41. The FBT 30 receiving the ABL control signal receives a high voltage from the high voltage output circuit (not shown), raises its voltage level and outputs the high voltage. The high voltage is applied to the anode junction point 50-1. Here, the screen brightness compensation signal with respect to the screen brightness decreasing factor applied from the micro computer 20 is applied to the ABL adjusting port 41 and to the ABL circuit 42 through the resistor R. The ABL circuit 42 receiving the screen brightness compensation signal applied for the micro computer 20 applies the ABL adjusting signal according to the screen brightness compensation signal input to the contrast port 43. Additionally, the contrast port 43 receiving the contrast control signal among the display monitor screen control signals output from the micro computer applies the ABL adjusting signal with the contrast control signal to the video pre-amplifier 44. The video pre-amplifier 44 receiving the ABL adjusting signal and the contrast control signal amplifies the R. G. B. video signals applied from PC 10 into a predetermined level and compensates the screen brightness according to the contrast control signal and the ABL adjusting signal according to the screen brightness compensation signal. The R. G. B. video signals output from the video pre-amplifier 44 are finally amplified in the video main amplifier 45 to thereby control the difference in their levels. Here, the cut-off adjusting unit 46 controls the difference of potential of the video cut-off 47 according to the screen brightness compensating signal BRIGHT. Thereafter, CRT 50 receiving the R. G. B. video signals output from the video cut-off 47 compensated according to the brightness compensation signal BRIGHT through the cut-off adjusting unit 46 displays images with the R. G. B. video signal inputs. Therefore, the screen brightness according to the screen brightness decreasing factor in the display monitor is compensated by the cut-off adjusting unit 46 and the ABL circuit 42.

A method of automatically compensating the brightness of the screen according to the screen brightness decreasing factor will be described below with reference to the attached drawing.

Figure 10:
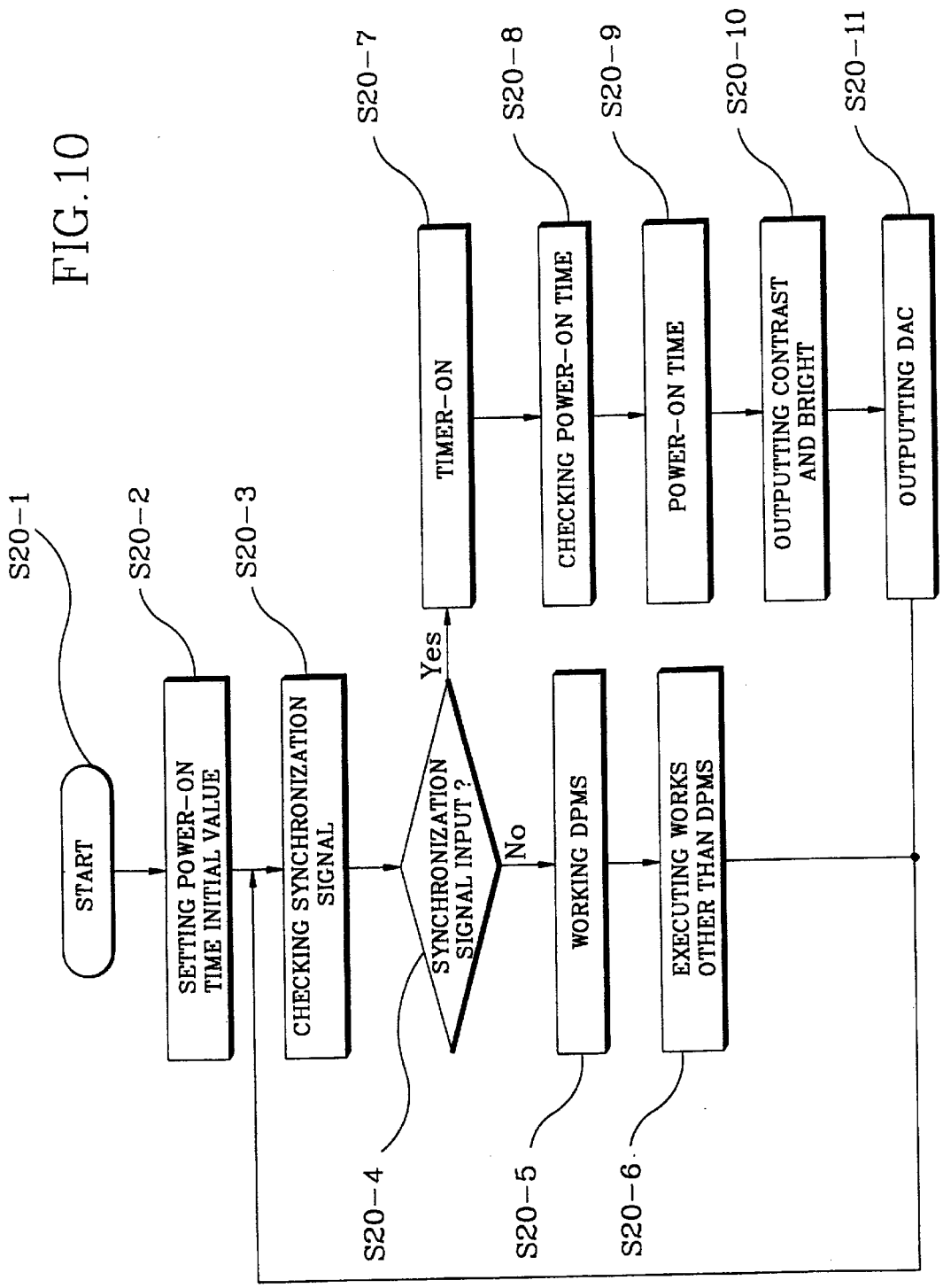
FIG. 10 is a flowchart illustrating a method of automatically compensating for the brightness of a screen according to the invention.

As illustrated in FIG. 10, the method of automatically compensating the brightness of the screen of the invention includes the steps of: starting to compensate for the brightness of the screen according to the screen brightness decreasing factors generated in a display monitor in step S20-1; setting an initial value for setting a power-on time in step S20-2 when a brightness control of a display monitor screen starts in the above step; checking in step S20-4 if a synchronization signal is input when the initial value is set in the above step S20-2; executing data project management system work, i.e., Display Power Management System (DPMS) for reduce power consumed in the display monitor in step S20-5 if the synchronization signal is not detected in the above step S20-4; executing work other than the data project management system work in step S20-6 if the data project management system work is completed in the above step S20-5; turning on a timer in step S20-7 if the synchronization signal is input in the above step S20-4; checking a power-on time in step S20-8 if the timer is turned on in the above step S20-7; storing and outputting the power-on time in step S20-9 if the power-on time is detected in the above step S20-8; outputting contrast and brightness compensation signals according to the stored power-on time in step S20-10; outputting a digital-to-analog converting (DAC) signal for converting the contrast and brightness compensation signal from digital to analog in step S20-11; and returning in step S20-12 to the above synchronization signal checking step S20-3 if the contrast and brightness compensation signal converted to analog is output in the above step S20-11.

An operation of the above-mentioned method is described below.

Firstly, the display monitor is turned on through the starting step S20-1. If the monitor is turned on, the power-on time is set to "0" in step S20-1. If the power-on time is set to "0", the horizontal and vertical synchronization signals applied from PC 10 are checked in step S20-3. If the checking is completed, it is determined if the horizontal and vertical synchronization signals are input in step S20-4. If it is determined that the synchronization signals are not generated, DPMS job is executed in step S20-5. For this, the micro computer 20 (see FIG. 4) detects if the horizontal and vertical synchronization signals are generated, and generates DPMS mode signal. That is, in the order of standby mode, suspend mode and power off mode, the DPMS mode signal is generated to reduce power consumption in the display monitor. If the DPMS mode is executed in the DPMS work step S20-5, the invention utilizes other system which does not use the DPMS work system occupying the monitor display in a work executing step S20-6. That is, a user can listen to music through a speaker integrally formed with the monitor, which is not executed through the CRT 50 (see FIG. 4). Through this work executing step S20-6 excluding the DPMS work, the method of the invention returns to the synchronization signal checking step S20-3 through the return step S20-12 in the middle of listening to music.

When returning the synchronization signal checking step S20-3, the micro computer 20 detects the horizontal and vertical synchronization signals applied from PC 10. Through the synchronization signal input determining step S20-4, it is determined if the horizontal and vertical synchronization signals are input. If the synchronization signals are input, a timer for measuring power-on time operates through a timer-on step S20-7. That is, the time in which the horizontal and vertical synchronization signals are input are accumulated and counted. Through the timer-on step S20-7, the counting result is checked in a power-on time checking step S20-8. If the accumulated time is counted, the accumulated time is stored in the $E^2$PROM 32 (see FIG. 4). The accumulation time stored in $E^2$PROM 32 is output in a power-on time outputting step S20-9. The accumulation time signal is applied to the brightness compensating unit 23 (FIG. 4). The compensating unit 23 generates the screen brightness compensation signal for compensating for the brightness decreasing factor according to the accumulation time of the power on time. The brightness compensation signal generated through the power-on time outputting step S20-9 is output in the contrast and brightness compensation signal outputting step S20-10, and used for converting digital signal into analog signal through the DAC outputting step S20-11. That is, in DAC (not shown), the digital brightness compensation signal output through the brightness compensating unit 23 is converted into the analog signal. The brightness compensation signal output in the DAC outputting step S20-11 returns to the synchronization signal checking step S20-3 through the returning step S20-12, thereby being repeated in a predetermined cycle.

The timer-on step S20-7 for counting the accumulation time of the horizontal and vertical synchronization signals will be described in detail with reference to FIG. 11.

Figure 11:
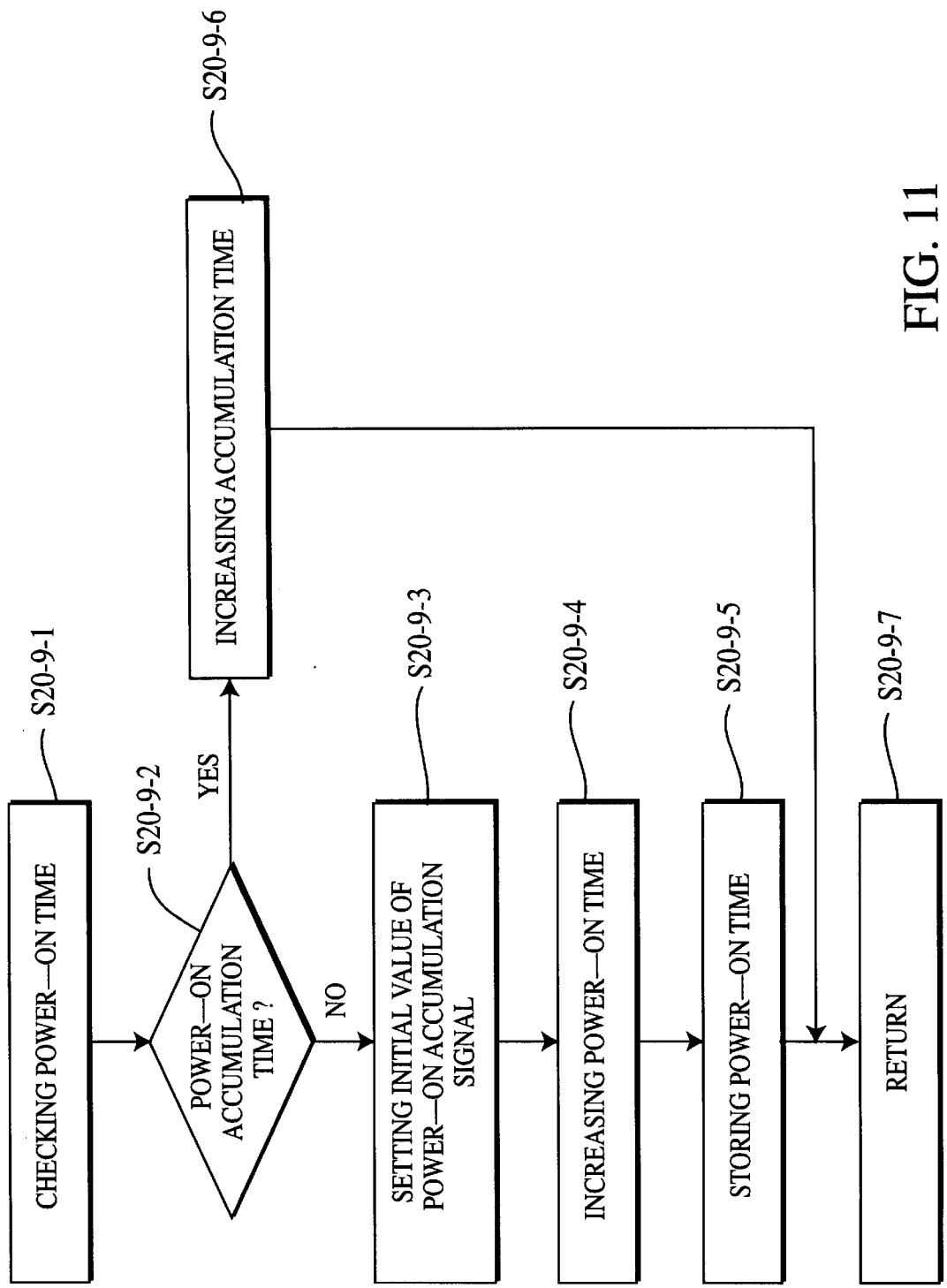
FIG. 11 is a flowchart illustrating a timer-on step of FIG. 10 in detail.

As illustrated in FIG. 11, the timer-on step S20-7 includes the steps of: checking a power-on time of a display monitor in step S20-9-1; determining if the power-on accumulation time is over one period of time according to the accumulation checking time interval in step S20-9-2; setting an initial value for one period of time of the power-on accumulation time in step S20-9-3 if one period of time is not elapsed in the above step S20-9-2; increasing an accumulation time of the power-on time in step S20-9-4 if the initial value is set; storing the one-period of accumulated time in S20-9-5 if the power-on time is accumulatively increased and therefore one period of time is elapsed; increasing one period of the power-on accumulation time S20-9-6 if the one period of the power-on accumulation time is elapsed; and returning to the above power-on time checking step S20-9-1 if the one accumulation period is increased or the one-period of accumulation time is elapsed.

The steps are described below in detail.

If a synchronization signal is input in the synchronization signal input determining step S20-4 (see FIG. 10) for determining the synchronization signal is input, the power-on time is checked through the power-on time checking step S20-9-1 included in the timer-on step S20-7. If the power-on time is checked, the power-on time is determined in the power-on accumulation time determining step S20-9-2. That is, in case of setting a period of the power-on time to one hour, it is determined if the power-on time is over one period through the power-on accumulation time determining step S20-9-2. If the power-on time is not more than one period, for example, one hour, the initial value is set to "0" through the step of setting initial value of power-on accumulation time S20-9-3. If the one period of the power-on time is initialized to "0", the power-on time is increased through the power-on time increasing step S20-9-4. That is, as one period of time of the power-on time is set to one hour, the power-on time is increased to one hour. If the power-one time becomes one hour, the power-on time is stored in $E^2$PROM 22 (FIG. 4) through the power-on time storing step S20-9-5. If the one period of the power-on time is completed, the returning step S20-9-7 is executed to thereby return to the power-on period time determining step S20-9-2. If the step returns to the power-on period time determining step S20-9-2, the power-on time becomes one period and thus the accumulation time increasing step S20-9-6 for increasing the accumulation time is executed. If the accumulation time increasing step S20-9-6 is executed, after one period of accumulation time is increased, the returning step S20-9-7 is executed to perform the power-on period time determining step S20-9-2. Through the steps, if the one period of power-on time is counted, the period of the power-on time is increased to re-count one period of time.

Meanwhile, there will be described in detail the step of outputting the contrast and brightness compensation signals according to the screen brightness decreasing factor S20-10 by counting the period of the power-on time.

Figure 12:
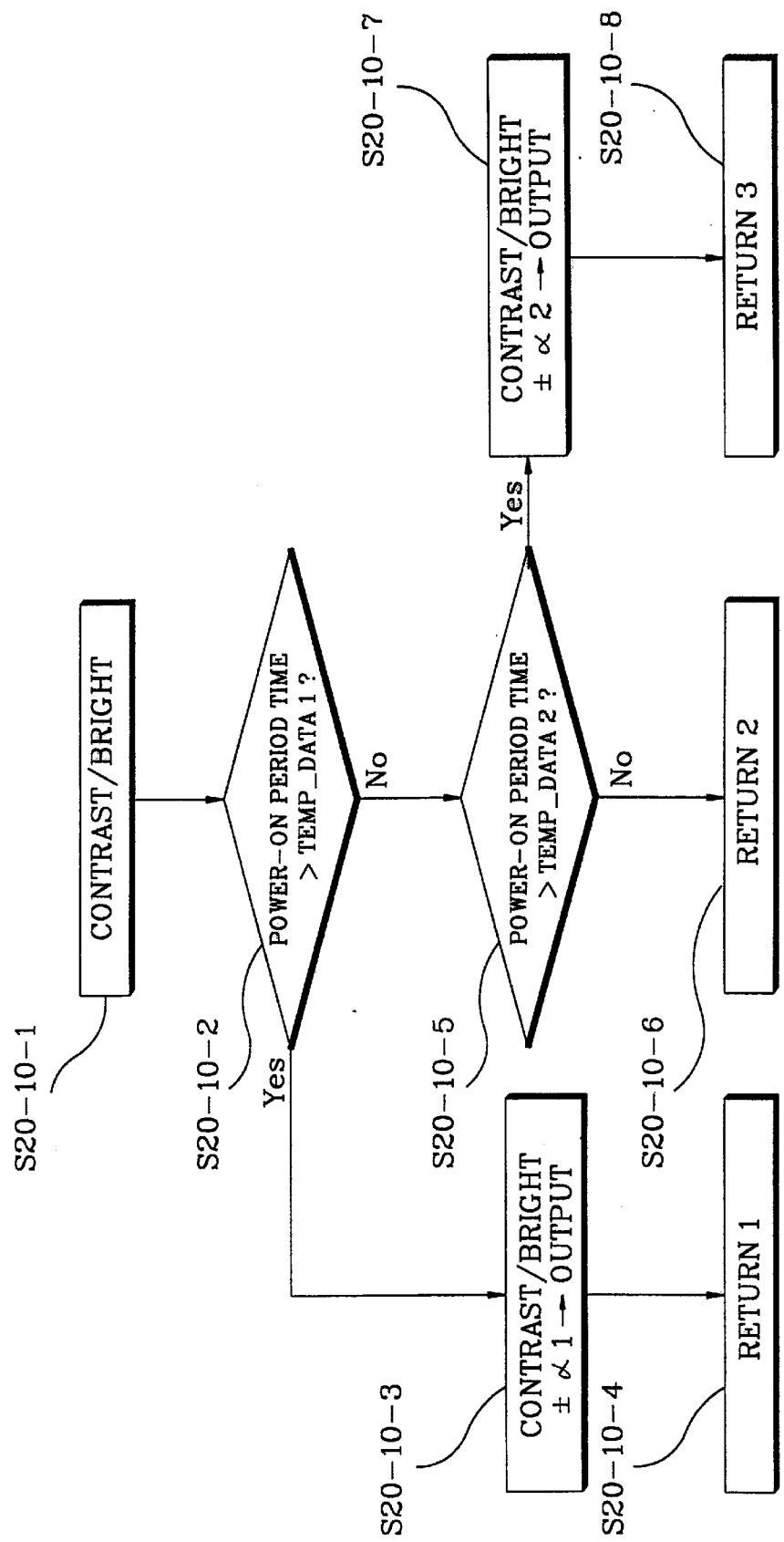
FIG. 12 is a flowchart illustrating a step of outputting a contrast/brightness compensation signal of FIG. 10.

FIG. 12 is a flow chart illustrating the step of outputting the contrast and brightness compensation signals includes the steps of: calculating contrast and brightness compensation signal values according to the power-on time S20-10-1; comparing the power-on period of time with accumulated used time data S20-10-2 to determine if the contrast and brightness compensation signal value calculated in the above step is the one period data of power-on time; outputting the contrast and brightness compensation signal values ±α1 S20-10-3 if the power-on period of time is longer than the accumulated using time data; firstly returning S20-20-4 to the step of calculating the contrast and brightness compensation signals S-20-10-1 if the previous step is completed; comparing one period of power-on time with extended accumulated using time data S20-10-5 if the power-on period of time is shorter than the accumulated using time data in the above comparing step; secondly returning S20-10-6 to the step of calculating the contrast and brightness compensation signals S20-10-1 if the one period of power-on time is shorter than the extended accumulated using time data in the above step of comparing the one period of power-on time with the extended accumulated using time data; outputting the contrast and brightness compensation signals value ±α2 S20-10-7 if the one period of power-on time is longer than the extended accumulated using time data in the above step of comparing the one period of power-on time with the extended accumulated using time data; and thirdly returning S20-10-8 to the step of calculating the contrast and brightness compensation signals S20-10-1 if the contrast and brightness compensation signal value ±α2 is output in the above step.

Through the contrast and brightness compensation signal value calculating step S20-10-1, the contrast and brightness compensation signals Contrast and BRIGHT according to the power-on time are output. The contrast and brightness compensation signal values are compared with temporary data TEMP-DATA1 to determine if the values are the data according to one period of power-on time. After the comparison, if the signal according to one period of power-on time is longer than the temporary data TEMP-DATA1, there is performed a step S20-10-3 for outputting the contrast and brightness compensation signal value ±α1. If the step S20-10-3 is completed, the first returning step S20-10-4 is executed to return to the contrast and brightness compensation signal value calculating step S20-10-1.

If the step returns to the step S20-10-1, the power-on time data and the temporary data TEMP-DATA1 are compared. The power-on time data are shorter than the temporary data TEMP-DATA1, a step of comparing one period of power-on time with the extended accumulated using time data, namely, the temporary data TEMP-DATA2 is performed S20-10-5. In the previous step S20-10-5, if the one period of power-on time is longer than the extended accumulated using time data, namely, the temporary data TEMP-DATA2, the second returning step S20-10-6 for returning to the step S20-10-1 is performed. When returning to the step S20-10, the step S20-10-5 of comparing the power-on time period with the temporary data TEMP-DATA2 are performed. Therefore, if the one period of power-on time is longer than the temporary data TEMP-DATA2, the step S20-10-7 for outputting the contrast and brightness compensation signal value ±α2 is performed. Through the step S20-10-7, the data according to one period of power-on time are obtained, the third returning step S20-10-8 is performed to return to the step S20-10-1, thereby obtaining the value of the one period of power-on time. In the above-mentioned manner, if the data values according to one period of power-on time are obtained, the time in one period of power-on time is increased. The contrast and brightness compensation data are calculated according to the period of power-on time.

As described above, the invention can display object clearly by automatically compensating the brightness of the screen with peripheral circuits even though the light emitting efficiency is decreased due to the long term use of CRT.

It will be apparent to those skilled in the art that various modifications and variations can be made in the device and method of automatically compensating the screen brightness of the present invention without departing from the spirit or scope of the invention. Thus, it is intended that the present invention cover the modifications and variations of this invention provided they come within the scope of the appended claims and their equivalents.

What is claimed is:

1. A cathode ray tube video display device, comprising:
   a micro computer for receiving data of a plurality of factors which decrease the brightness of a screen over time, computing a decreased amount of the brightness of the screen in response to said data, and outputting a screen brightness compensation signal to compensate for the computed decreased amount of the brightness of the screen; and
   cathode ray tube controlling means for receiving the screen brightness compensation signal output from the micro computer, controlling a brightness level of a chrominance signal applied externally according to a level of the screen brightness compensation signal, and compensating the brightness of the screen.

2. The cathode ray tube video display device as claimed in claim 1, wherein the micro computer comprises:
   an integrator for receiving said data of said plurality of factors which decrease the brightness of the screen over time, generating integration value by multiplying said data by respective gain values and integrating, with respect to an elapsed time period. each value obtained as a result of the multiplying, and generating an accumulated integration value by summing said integration values;
   storage means for storing the accumulated integration value generated by the integrator; and
   a brightness compensating unit for receiving the accumulated integration value stored in the storage means, generating a compensation function, and summing the compensation function with an initial value of the brightness compensation signal to output the screen brightness compensation signal.

3. The cathode ray tube video display device as claimed in claim 1, wherein the cathode ray tube controlling means is formed of one among a first grid controlling unit, a contrast controlling unit, a cut-off adjusting unit and an automatic beam controlling circuit unit.

4. A cathode ray tube video display device, comprising:
   a micro computer for receiving data of a plurality of factors which decrease the brightness of a screen over time, computing a decreased amount of the brightness of the screen in response to said data, and outputting a screen brightness compensation signal to compensate for the computed decreased amount of the brightness of the screen; and
   a grid controlling unit for receiving the screen brightness compensation signal output from the micro computer to adjust the light of the cathode ray tube by controlling an amount of electrons emitted from a cathode of the cathode ray tube.

5. A cathode ray tube video display device, comprising:
   a micro computer for receiving data of a plurality of factors which decrease the brightness of a screen over time, computing a decreased amount of the brightness of the screen in response to said data, and outputting a screen brightness compensation signal to compensate for the computed decreased amount of the brightness of the screen; and
   a cut-off adjusting unit responsive to the screen brightness compensation signal from the micro computer for controlling a video cut-off level to compensate for the brightness of the screen by controlling a difference among RGB video signal levels.

6. A cathode ray tube video display device, comprising:
   a micro computer for receiving data of a plurality of factors which decrease the brightness of a screen over time, computing a decreased amount of the brightness of the screen in response to said data, and outputting a screen brightness compensation signal to compensate for the computed decreased amount of the brightness of the screen;
   an automatic brightness limiting (ABL) adjusting port responsive to said screen brightness compensation signal for controlling an output level of a high voltage output from a flyback transformer;
   an ABL circuit responsive to said high voltage output from said flyback transformer according to the screen brightness compensation signal for detecting the current amount of the high voltage, and outputting an ABL adjusting signal according to the result of the detection; and
   a contrast port for providing a contrast adjustment signal from said micro computer and said ABL adjusting signal from said ABL circuit to a video pre-amplifier, wherein said video preamplifier amplifier amplifies received RGB video signals to a predetermined level and compensates for their brightness.

7. A cathode ray tube video display device, comprising:

a micro computer for receiving data of a plurality of factors which decrease the brightness of a screen over time, computing a decreased amount of the brightness of the screen in response to said data, and outputting a screen brightness compensation signal to compensate for the computed decreased amount of the brightness of the screen;

a cut-off adjusting unit responsive to the screen brightness compensation signal from the micro computer for controlling a video cut-off level to compensate for the brightness of the screen by controlling a difference among RGB video signal levels;

an automatic brightness limiting (ABL) adjusting port providing said screen brightness compensation signal to a flyback transformer via a resistor for controlling an output level of a high voltage output from said flyback transformer and providing said screen brightness compensation signal via said resistor to an ABL circuit, said ABL circuit outputting an ABL adjusting signal in response said screen brightness compensation signal; and a contrast port for providing a contrast adjustment signal from said micro computer and said ABL adjusting signal from said ABL circuit to a video pre-amplifier, wherein said video preamplifier amplifier amplifies received RGB video signals to a predetermined level and compensates for their brightness.

8. An automatic screen brightness compensating method, comprising the steps of:

setting an initial value for setting a power-on time when a brightness control of a display monitor screen starts;

checking if a synchronization signal is input when the initial value is set;

executing data project management system work for reducing power consumed in the display monitor if the synchronization signal is not detected;

executing work other than the data project management system work if the data project management system work is completed;

turning on a timer if the synchronization signal is input;

checking a power-on time if the timer is turned on;

storing and outputting the power-on time if the power-on time is detected;

outputting contrast and brightness compensation signals according to the stored power-on time;

outputting a digital-to-analog converting signal for converting the contrast and brightness compensation signals from digital to analog; and returning to the synchronization signal checking step if the contrast and brightness compensation signals converted to analog are output.

9. The automatic screen brightness compensating method as claimed in claim 8, wherein the step of turning on the timer comprises the steps of:

checking a power-on time of a display monitor;

determining if the power-on accumulation time is over one period of time according to the accumulation checking time interval;

setting an initial value for one period of time of the power-on accumulation time if one period of time is not elapsed in the above step;

increasing an accumulation time of the power-on time if the initial value is set;

storing the one-period of accumulated time if the power-on time is accumulatively increased and therefore one period of time is elapsed;

increasing one period of the power-on accumulation time if the one period of the power-on accumulation time is elapsed; and returning to the above power-on time checking step if the one accumulation period is increased or the one-period of accumulation time is elapsed.

10. The automatic screen brightness compensating method as claimed in claim 8, wherein the step of outputting contrast and brightness compensation signals comprises the steps of:

calculating contrast and brightness compensation signal values according to the power-on time;

comparing the power-on period of time with accumulated using time data to determine if the contrast and brightness compensation signal value calculated in the above step is the one period data of power-on time;

outputting contrast and brightness compensation signal values $\pm\alpha1$ if the power-on period of time is longer than the accumulated using time data;

firstly returning to the step of calculating the contrast and brightness compensation signals if the previous step is completed;

comparing one period of power-on time with extended accumulated using time data if the power-on period of time is shorter than the accumulated using time data in the above comparing step;

secondly returning to the step of calculating the contrast and brightness compensation signals if the one period of power-on time is shorter than the extended accumulated using time data in the above step of comparing the one period of power-on time with the extended accumulated using time data;

outputting the contrast and brightness compensation signal values $\pm\alpha2$ if the one period of power-on time is longer than the extended accumulated using time data in the above step of comparing the one period of power-on time with the extended accumulated using time data; and thirdly returning to the step of calculating the contrast and brightness compensation signal if the contrast and brightness compensation signal values $\pm\alpha2$ are output in the above step.

* * * * *